United States Patent [19]
Kasai

[11] Patent Number: 4,927,677
[45] Date of Patent: May 22, 1990

[54] COMPOSITE MATERIALS AND TOP MATERIALS FOR RETORT CONTAINER
[75] Inventor: Ryusuke Kasai, Kiyose, Japan
[73] Assignee: Nikka Co., Ltd., Kanagawa, Japan
[21] Appl. No.: 187,297
[22] Filed: Apr. 28, 1988
[30] Foreign Application Priority Data
Apr. 28, 1987 [JP] Japan .................. 62-105521
Apr. 28, 1987 [JP] Japan .................. 62-105522
[51] Int. Cl.$^5$ .................. B32B 27/00; B65D 5/00
[52] U.S. Cl. .................. 428/36.6; 428/215;
428/323; 428/349; 428/475.8; 428/516;
428/518; 428/520; 428/910; 220/DIG. 14;
220/260
[58] Field of Search .................. 428/475.8, 349, 518,
428/36.6, 520, 516, 910, 323, 215
[56] References Cited
U.S. PATENT DOCUMENTS
4,407,873 10/1983 Christensen et al. .................. 428/35

FOREIGN PATENT DOCUMENTS
1510115 5/1978 United Kingdom .

Primary Examiner—P. C. Ives
Attorney, Agent, or Firm—Birch, Stewart, Kolasch & Birch

[57] ABSTRACT

Composite materials for retort container comprising a biaxially stretched film of a copolymer of vinylidene chloride and an acrylic ester and a polypropylene film formed on one or both sides of the biaxially stretched film. On the polypropylene film may be further formed a talc-blended or odorless polypropylene film directly or on another polypropylene film. Top materials for the container comprise a biaxially stretched film of the vinylidene-acrylic ester copolymer, a sequential biaxially stretched film of nylon 6 formed on one side of the biaxially stretched film, and a heat-sealable heat-resistant plastic film formed on the other side.

20 Claims, 3 Drawing Sheets

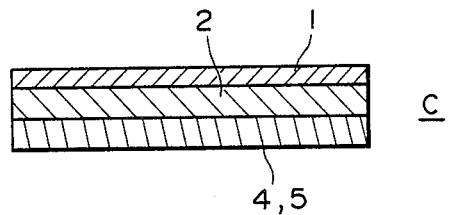
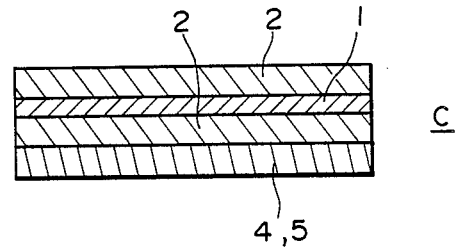

COMPOSITE MATERIALS AND TOP MATERIALS FOR RETORT CONTAINER

BACKGROUND OF THE INVENTION

1. Field of the Invention

This invention relates to composite materials which are suitable for fabricating plastic retort containers of a rigid type. More particularly, it relates to composite materials for retort containers which have good gas and vapor barrier properties without a lowering of these properties after retort treatment. The present invention also relates to top materials which are adapted for stopping or closing openings of plastic retort containers of a rigid type, especially those made of the above composite materials, and more particularly, to top materials for retort containers which do not loosen when subjected to a retort treatment or process after heat-sealing the material to an opening of a container and which have good gas and vapor barrier properties.

2. Description of the Prior Art

Known composite materials used to make plastic retort containers of a rigid type are those materials including ethylene-vinyl alcohol copolymer films laminated with polypropylene films on opposite sides, polyvinylidene films laminated with polypropylene films on opposite sides, and the like. However, these composite materials have the problem that when they are subjected to retorting, gas and vapor barrier properties are considerably lowered. With the former composite materials using ethylene-vinyl alcohol copolymer and polypropylene, the oxygen gas permeability prior to the retort treatment is approximately 0.5 $cc/m^2$-24 hrs-atm. When retorted, the ethylenevinyl alcohol copolymer absorbs water and the oxygen gas permeability after the retort treatment is in the order of 18 to 24 $cc/m^2$-24 hrs-atm. The latter polyvinylidene chloride and polypropylene composite material has an oxygen gas permeability of 4 $cc/m^2$-24 hrs-atm prior to the retort treatment and 8 $cc/m^2$-24 hrs-atm after the retort treatment.

Accordingly, when the rigid containers for retort using these materials are filled with foods, tightly sealed and subjected to retort treatment, the gas and vapor barrier properties of the containers considerably deteriorate by the retort treatment. This may cause gases such as oxygen to intrude into the container and the water in the food to be dissipated outside the container on the market, with the fear that the food will change in quality.

On the other hand, currently employed top materials for closing an opening of a plastic retort container of a rigid type include laminates comprised of an ethylene-vinyl alcohol polymer film or a polyvinylidene chloride film laminated with a simultaneously biaxially stretched film of nylon 6 on opposite sides, and a heat-sealable plastic film, such as polypropylene, formed on one of the nylon film layers.

However, this type of top material is not balanced in thermal shrinkage along the lengthwise and breadthwise directions since the two simultaneously biaxially stretched film layers of nylon 6 are formed. When the container is closed or sealed and then subjected to retort treatment, it may become loosened either in the lengthwise direction or in the breadthwise direction, not making a completely smooth surface of the top material. In addition, the above top material considerably lowers in gas and vapor barrier properties when retorted. Accordingly, when a food is filled in a retort container which is subsequently closed with the top material and subjected to retort treatment, there is the high possibility on the market that gases such as oxygen enter into the container, or the water in the food is dissipated outside the container, thereby changing the quality of the food. Moreover, since the top material is provided with two simultaneously biaxially stretched film layers of nylon 6, it is expensive.

Another top material has been proposed, which comprises an ethylene-vinyl alcohol copolymer film or polyvinylidene chloride film, a biaxially stretched film of nylon 66 formed on one side of the first-mentioned film, and a heat-sealable plastic film formed on the other side. This top material has a better heat-shrinking balance along the lengthwise and breadthwise directions than the above top material. Additionally, the nylon layer is only one, so that the top material is more inexpensive although the nylon 66 itself is relatively expensive. However, the problem of the lowering in gas and vapor barrier properties as caused by the retort treatment has not yet been solved.

SUMMARY OF THE INVENTION

It is accordingly an object of the invention to provide a composite material for a retort container which has good gas and vapor barrier properties which are not lowered when the material undergoes a retort treatment.

It is another object of the invention to provide a composite material in which when the material is used to form retort containers, there is no fear that any content in the container undergoes a change in quality.

It is further object of the invention to provide a top material which is able to form a smooth top without loosening under retorting conditions and which does not lower in gas and vapor barrier properties when subjected to retort treatment.

It is a still further object of the invention to provide a top material which is inexpensive and is particularly suitable for use in combination with a retort container made from the composite material mentioned above.

The above objects can be achieved, according to the invention, by a composite material for a retort container which comprises a biaxially stretched film of a copolymer resin of vinylidene chloride and an acrylic ester, and a polypropylene film formed on one or both sides of the biaxially stretched film. A polypropylene film blended with an inorganic talc filler or a polypropylene film having little or no odor (hereinafter referred to as "odorless polypropylene film") may be further formed directly on the polypropylene film formed on one side of the biaxially stretched film, or through another polypropylene film formed on the first-mentioned polypropylene film. The composite material of the invention uses, as a barrier layer, the biaxially stretched film of the vinylidene chloride and acrylic ester copolymer resin whose gas and vapor barrier properties are not low when the film is subjected to retort treatment. A polypropylene film is laminated on one or both sides of the biaxially stretched film. Accordingly, the composite material has an oxygen gas permeability of 1 $cc/m^2$-24 hrs-atm prior to and after retort treatment, and a water vapor permeability of 1 $g/m^2$-24 hrs-atm prior to and after the retort treatment. Thus, the gas and vapor barrier properties are excellent both prior to and after the retort treatment.

When the polypropylene film blended with an inorganic talc filler is laminated to or superposed, directly or through another polypropylene film, on the polypropylene film laminated on one side of the biaxially stretched film, cold proofing and thermal stability are improved and odor does not transfer from a content to the container. In addition, such a composite material has good post-shaping stability and is convenient in thermal disposal. Ordinary polypropylene, which is not blended with any inorganic talc filler, has a stable temperature range of from $-5°$ to $120°$ C., but those propylene resins blended with inorganic talc fillers are stable over a temperature of from $-30°$ to $130°$ C. Accordingly, the use of the blended polypropylene leads to an improvement of cold proofing and thermal resistance. Moreover, the blended polypropylene rarely permits any odor to transfer. The container using the blended polypropylene is adapted for packing contents which necessarily require freedom from any odor from other origins. Since the composite material laminated with the talc-blended polypropylene film is able to produce a container with good post-shaping or molding stability, the workability at the time of charging contents is improved. Moreover, ordinary polypropylene generates heat at a calorific value of 11000 Kcal/kg when burnt, but the blended polypropylene is burnt at a calorific value of 7700 Kcal/kg which is lower by about 30%. Accordingly, the blended polypropylene can be beneficially burnt without damaging incinerators.

When an odorless polypropylene film is laminated to the polypropylene film formed on one side of the biaxially stretched film with or without another polypropylene film formed on the first-mentioned polypropylene film, odor does not transfer from the odorless film to the contents.

The present invention also contemplates to provide a top material for retort container which comprises a biaxially stretched film of a copolymer resin of vinylidene chloride and an acrylic ester, a sequential biaxially stretched film of nylon 6 formed on one side of the copolymer resin film, and a heat-sealable, heat-resistant plastic film formed on the other side. The heat-sealable, heat-resistant plastic film may be formed on the other side of the copolymer resin film through a simultaneously biaxially stretched film of nylon 6.

The top material of the invention makes use of the sequential biaxially stretched film of nylon 6 which has well-balanced heat shrinkage along lengthwise and breadthwise directions, so that it does not become loosened at the time of retort treatment with a smooth surface of the top material after the treatment. The use of the biaxially stretched film of the copolymer of vinylidene chloride and an acrylic ester as an intermediate barrier layer ensures excellent gas and vapor barrier properties. These barrier properties do not lower after the retort treatment of the material. The use of the relatively inexpensive sequential biaxially stretched film of nylon 6 leads to a substantial cost reduction. The top material is conveniently used in closing the retort container formed from the composite material of the invention, contributing to make food packages having good gas and vapor barrier properties as a whole.

Accordingly, the best result is given when a retort container of a rigid type made of the composite material according to the present invention is closed at its opening with a cover or top made of the top material according to the present invention. The container is preferably used for foods.

BRIEF DESCRIPTION OF THE DRAWINGS

The objects, features and advantages of the invention will be better understood with reference to the accompanying drawings, in which:

FIGS. 1 to 6 are, respectively, sectional views of composite materials according to embodiments of the invention;

DETAILED DESCRIPTION OF THE INVENTION

Figure 1:
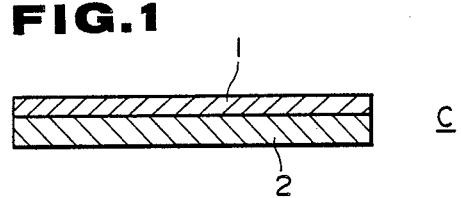
Figure 2:
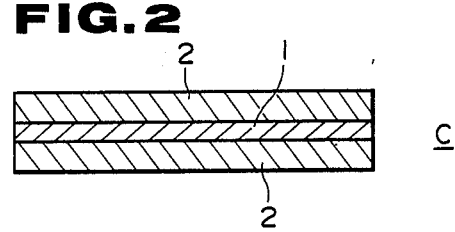

Reference is now made to the accompanying drawings and particularly, to FIGS. 1 through 6, in which like reference numerals indicate like members or parts. FIGS. 1 and 2 generally shown a composite material C, which includes a biaxially stretched film 1 of a copolymer resin of vinylidene chloride and an acrylic ester used as a barrier layer and a polypropylene film 2 formed on one side, as shown in FIG. 1, of the biaxially stretched film 1 or both sides as shown in FIG. 2.

The composite materials shown in FIGS. 3 to 6 are those which comprise the biaxially stretched film 1 as a barrier layer and the polypropylene film 2 formed on one side (FIGS. 3 and 5) or both sides (FIGS. 4 and 6) of the film 1. On the polypropylene film 1 formed on one side of the biaxially stretched film 1 is further formed a polypropylene film 4 blended with an inorganic talc filler or an odorless polypropylene film 5 through another polypropylene film 3 (FIGS. 3 and 4) or without use of the film 3 (FIGS. 5 and 6).

The biaxially stretched film 1 is preferably made of a copolymer obtained by copolymerization of vinylidene chloride and an acrylic ester at a mixing ratio by weight of about 95:5 to about 80:20. The acrylic ester is preferably one shown by the following formula (1):

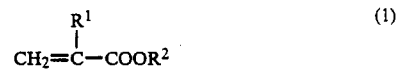

where $R^1$ represents hydrogen or methyl group and $R^2$ represents a substituted or unsubstituted monovalent hydrocarbon group having 1 to 20 carbon atoms, more preferably an alkyl group having 1 to 5 carbon atoms. The biaxially stretched film 1 is commercially available, for example, from Asahi Chem. Co. Ltd., under the designation of Saran UB, which is, in fact, conveniently used in the practice of the invention. The type of polypropylene used as the film 2 and the film 3 intervening between the film 2 and the blended polypropylene film 4 or odorless polypropylene film 5 is not critical.

The blended polypropylene film 4 is preferably made of a blend of polypropylene and from about 25 to about 35 wt%, preferably about 30 wt%, of an inorganic talc filler based on the total blend with a specific gravity of from about 1.15 to about 1.25, preferably about 1.2. Specific and favorable examples of the blended polypropylene include 300-RS available from Calp Ind, Co., Ltd.

The polypropylene film 5 having no or little odor used in the present invention means one in which when a container made of the film is poured with boiling water, covered and opened about 3 minutes after the covering, and when the boiling water is discharged, one becomes aware of little odor of the polypropylene. This type of polypropylene is commercially available from Toray Ltd., under the designation of 1200-S. It will be noted that odorless polypropylene films blended with inorganic talc fillers are also available under the designation of 200-BS from Calp Ind. Co., Ltd.

The barrier layer of the biaxially stretched film 1 has generally a thickness of from about 15 to about 50 micrometers, preferably from about 20 to about 40 micrometers. The polypropylene film 2 formed on one side or both sides of the barrier layer has a thickness of from about 100 to about 800 micrometers, preferably from about 600 to about 800 micrometers for one side, and has from about 50 to about 400 micrometers, preferably from about 300 to about 400 micrometers, for both sides.

The thickness of the blended polypropylene film 4 is in the range of from about 400 to about 900 micrometers, preferably from about 600 to about 700 micrometers, and the thickness of the odorless polypropylene film is in the range of from about 400 to about 900 micrometers, preferably from about 600 to about 700 micrometers.

If the polypropylene film 3 is provided between the polypropylene film 2 formed on one side of the barrier layer 1 and the blended polypropylene film 4 or odorless polypropylene film 5, the thickness is in the range of from about 50 to about 100 micrometers, preferably from about 50 to about 60 micrometers.

Figure 3:
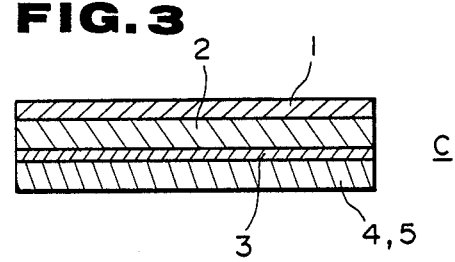
Figure 4:
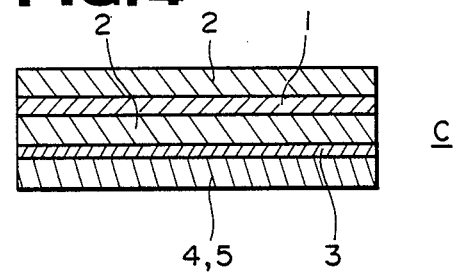

The total thickness of the composite film is in the range of from about 400 to about 1000 micrometers, preferably from about 600 to about 800 micrometers for the case where the polypropylene film 2 alone is formed only one side of the biaxially stretched film 1 as in FIG. 1, and is in the range of from about 400 to about 1000 micrometers, preferably from about 600 to about 800 micrometers in case where the polypropylene layers 2,2 are formed on opposite sides of the film 1 as shown in FIG. 2. For the composite material having the polypropylene film 2 laminated on one side of the biaxially stretched film 1 and further laminated with the blended or odorless polypropylene film 4 or 5 through the polypropylene film 3 as shown in FIG. 3, the thickness is in the range of from about 500 to about 1200 micrometers, preferably from about 600 to about 800 micrometers. Likewise, for the composite material having the polypropylene films 2,2 formed on opposite sides of the biaxially stretched film 1 and further laminated on one polypropylene film 2 with the blended or odorless polypropylene film 4 or 5 through the polypropylene film 3 as shown in FIG. 4, the thickness is in the range of from about 500 to about 1200 micrometers, preferably from about 700 to about 900 micrometers. In the case where the polypropylene film 2 formed on one side of the biaxially stretched film 1 is laminated on the other side with the blended or odorless polypropylene film 4 or 5 without formation of the film 3 as shown in FIG. 5, the thickness is in the range of from about 400 to about 1000 micrometers, preferably from about 600 to about 800 micrometers. Moreover, with the case where one of the polypropylene films 2,2 formed on opposite sides of the biaxially stretched film 1 is laminated with the blended or odorless film 4 or 5 without formation of the film 3 as shown in FIG. 6, the thickness is in the range of from about 400 to about 1200 micrometers, preferably from about 600 to about 900 micrometers.

The manner of fabrication of the composite materials according to the invention is not critical, but the materials may be fabricated by known laminating techniques. The composite materials shown in FIGS. 1 and 3 are preferably made by a dry lamination method using urethane heat-resistant adhesives. The composite materials shown in FIGS. 3 and 4 are preferably made by a polypropylene sandwich lamination method of the blended or odorless film 4 or 5, the intervening polypropylene film 4 and the composite film of FIG. 1 or 2 made as mentioned above. Moreover, the composite materials of FIGS. 5 and 6 are preferably made by laminating the blended or odorless film 4 or 5 and the composite film of FIG. 1 or 2 by a thermal lamination technique. The adoption of the above techniques or methods enables one to fabricate the composite materials of the invention at higher production efficiencies.

The composite materials of the invention are suitable for fabrication of plastic retort containers of a rigid type. The resultant container has good gas and vapor barrier properties. For the fabrication of the container, the polypropylene film 2 in FIG. 1 and the blended or odorless polypropylene film 4 or 5 in FIGS. 3 to 6 should be an inner film of the container.

The blended or odorless polypropylene film 4 or 5 may be further laminated or superposed with a polypropylene film for heat-sealing purposes.

Figure 7:
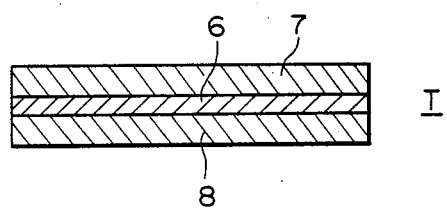
FIGS. 7 and 8 are, respectively, sectional views of top materials according to embodiments of the invention.

FIG. 7 shows a top material T which comprises a biaxially stretched film 6 made of a copolymer resin of vinylidene chloride and an acrylic ester, a sequential biaxially stretched film 7 of nylon 6 laminated on one side of the film 6, and a heat-sealable heat-resistant plastic film 8 formed on the other side.

Figure 8:
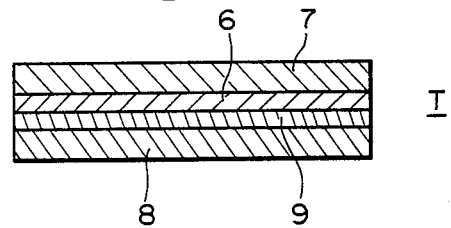

FIG. 8 shows another type of top material T which comprises the biaxially stretched film 6, the sequential biaxially stretched film 7 of nylon 6, and the heat-sealable heat-resistant plastic film 8 formed on the other side of the film 6 through a simultaneously biaxially stretched film 9 of nylon 6. These top materials are suitable employed for closing by heat-sealing an opening of a container made of the composite material according to the invention after filling the container with a content.

The biaxially stretched film 6 is preferably made of a copolymer of vinylidene chloride and an acrylic ester at a mixing ratio by weight of about 95:5 to about 80:20 as in the case of the composite material. The acrylic ester is preferably one shown by the above formula (1).

Saran UB mentioned with respect to the composite material is likewise used for this purpose.

The sequential biaxially stretched film 7 of nylon 6 is commercially available from Toyobo Co., Ltd., under the designation of Harden 1102-C.

The heat-sealable heat-resistant plastic film 8 is not critical and may be non-stretched polypropylene film, polyethylene film, plastic films made of blends of polypropylene and other polyolefins at a mixing ratio of about 7:3 to about 8:2, and other sealants including composite films of a high melting polypropylene film (m.p. 165° to 170° C.) and a low melting polypropylene laminated on opposite sides of the high melting polypropylene film which allow easy peeling by interlaminar separation and have thus an easy opening function.

In the practice of the invention, the thickness of the biaxially stretched film 6 is in the range of from about 10 to about 20 micrometers, preferably approximately 15 micrometers through the film 9, and preferably approximately 25 micrometers without the film 9. The thickness of the sequential biaxially stretched film 7 of nylon 6 is in the range of from about 10 to about 30 micrometers, preferably approximately 15 micrometers. The thickness of the heat-sealable heat-resistant plastic film 8 is in the range of from about 30 to about 50 micrometers and the thickness of the simultaneously biaxially stretched film 9 is in the range of from about 10 to about 30 micrometers, preferably approximately 15 micrometers. The total thickness of the top materials in preferably from about 70 to about 90 micrometers.

The manner of fabrication of the top materials of the invention is not limited to any specific techniques and any known lamination techniques may be used, of which it is preferred in view of the productivity that a dry lamination technique using urethane heat-resistant adhesives is used.

The top materials of the invention are suitably employed for closing an opening of plastic retort container of a rigid type by heat-sealing. The closed container is imparted with high gas and vapor barrier properties and has a smooth surface of the top material. It will be noted that the heat-sealable heat-resistant plastic film 8 in FIGS. 7 and 8 is used for heat-sealing to an opening of a container.

As will be appreciated from the foregoing, the composite materials for retort container have good gas and vapor barrier properties, and these properties do not lower after retort treatment. When these composite materials are used to make retort containers, contents undergo little or no change in quality during storage.

Moreover, when the inorganic talc filler-blended polypropylene film is laminated, cold proofing and thermal stability are improved and the odor of the polypropylene does not transfer to contents. The container obtained from this type of composite material exhibits good post-shaping stability and is advantageous in thermal disposal. When an odorless polypropylene film is laminated, no transfer of the odor of polypropylene occurs.

The top materials for retort container according to the invention has well-balance thermal shrinkage along lengthwise and breadthwise directions with good gas and vapor barrier properties. These properties do not lower after retort treatment. The top materials are more inexpensive than known counterparts. The use of the top materials contributes to enhance commercial values since a smooth top surface is obtained and can prevent contents from changing in quality, enabling one to make retort packs at low costs.

Examples of the present invention are given below by way of illustration and not by way of limitation.

EXAMPLE

A 15 micrometer thick biaxially stretched film made of a copolymer of vinylidene chloride and an acrylic ester (the mixing ratio of vinylidene chloride and an acrylic ester is by weight of 95:5) was laminated on opposite sides with a 50 micrometer thick polypropylene film by a dry lamination technique. Thereafter, an inorganic talc-blended polypropylene film having a thickness of 700 micrometers was laminated on one of the polypropylene film by a thermal lamination technique to obtain a composite material of the invention.

A 15 micrometer thick biaxially stretched film made of a copolymer of vinylidene chloride and an acrylic ester (the mixing ratio of vinylidene chloride and an acrylic ester is by weight of 95:5) was laminated on one side with a 25 micrometer thick sequential biaxially stretched film (Harden 102-C made by Toyobo Co., Ltd.) and on the other side with a 50 micrometer thick non-stretched polypropylene film, each by a dry lamination technique, thereby obtaining a top material.

Figure 9:
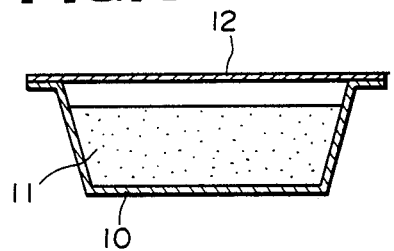
FIG. 9 is schematic sectional view showing a container formed from a composite material of the invention and closed with a top material of the invention at an opening of the container.

As shown in FIG. 9, a retort container 10 was fabricated using the composite material obtained above, followed by filling the container with a contents 11 and heat-sealing it with a sheet cover or top made of the top material 12 in order to close the opening.

What is claimed is:

1. A composite material for a retort container which comprises:
   a biaxially stretched film consisting essentially of a copolymer of vinylidene chloride and an acrylic ester shown by the following formula (1):

$$CH_2=\underset{\underset{R^1}{|}}{C}-COOR^2 \quad (1)$$

wherein $R^1$ represents hydrogen or a methyl group and $R^2$ represents a substituted or unsubstituted monovalent hydrocarbon group having 1 to 20 carbon atoms, and
   a first polypropylene film superposed on one or both sides of the biaxially stretched film.

2. The composite material according to claim 1, wherein said copolymer is a mixture of vinylidene chloride and said acrylic ester at a mixing ratio by weight of about 95:5 to about 80:20.

3. The composite material according to claim 1, wherein said composite material has a thickness of from about 400 to about 1000 micrometers when said polypropylene film is formed on one side or both sides.

4. The composite material according to claim 1, further comprising a blended polypropylene film having inorganic talc blended therein further superposed on said first polypropylene film which is formed directly on one side of said biaxially stretched film.

5. The composite material according to claim 4, wherein said composite material has a thickness of from about 500 to about 1200 micrometers.

6. The composite material according to claim 4, further comprising a second polypropylene film having a thickness from about 50 to about 100 micrometers provided between said first polypropylene film and said blended polypropylene film.

7. The composite material according to claim 4, wherein said blended polypropylene film has a talc content of from about 25 to about 35 wt%.

8. The composite material according to claim 1, further comprising an odorless polypropylene film having substantially no odor directly formed on said first polypropylene film which is formed on one side of said biaxially stretched film.

9. The composite material according to claim 1, further comprising an odorless polypropylene film having substantially no odor formed on a second polypropylene film which is in turn formed on said first polypropylene film, wherein said second polypropylene film has a thickness of from about 50 to about 100 micrometers.

10. A top material for a retort container which comprises:
   a first biaxially stretched film consisting essentially of vinylidene chloride and an acrylic ester shown by the following formula (1):

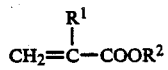

(1)

wherein $R^1$ represents hydrogen or a methyl group and $R^2$ represents a substituted or unsubstituted monovalent hydrocarbon group having 1 to 20 carbon atoms,
 a sequential biaxially stretched film of nylon 6 formed on one side of said first biaxially stretched film, and
 a heat-sealable heat-resistant plastic film formed on the other side of said first biaxially stretched film.

11. The top material according to claim 10, wherein said first biaxially stretched film is made of a copolymer obtained by copolymerization of vinylidene chloride and said acrylic ester at a mixing ratio by weight of about 95:5 to about 80:20.

12. The top material according to claim 10, wherein said top material has a thickness of from about 70 to about 90 micrometers and said first biaxially stretched film has a thickness of from about 10 to about 20 micrometers.

13. The top material according to claim 10, further comprising a simultaneously biaxially stretched film of nylon 6 provided between said first biaxially stretched film and said plastic film.

14. The top material according to claim 13, wherein said simultaneously biaxially stretched film of nylon 6 has a thickness of from about 10 to about 30 micrometers.

15. A retort container having a body portion for storing contents therein and a top portion for introducing contents thereinto, wherein said body portion is made of a composite material which comprises:
 a biaxially stretched film consisting essentially of a copolymer of vinylidene chloride and an acrylic ester shown by the following formula (1):

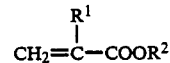

(1)

wherein $R^1$ represents hydrogen or a methyl group and $R^2$ represents a substituted or unsubstituted monovalent hydrocarbon group having 1 to 20 carbon atoms, and
 a polypropylene film superposed on one or both sides of the biaxially stretched film; and
wherein said top portion of said container is made of top material which comprises:
 a biaxially stretched film consisting essentially of vinylidene chloride and said acrylic ester of said formula (1),
 a sequential biaxially stretched film formed on one side of said biaxially stretched film, and
 a heat-sealable heat-resistant plastic film formed on the other side of said biaxially stretched film.

16. The retort container according to claim 15, wherein said biaxially stretched film is made of a copolymer obtained by copolymerization of vinylidene chloride and said acrylic ester at a mixing ratio by weight of about 95:5 to about 80:20.

17. The retort container according to claim 15, wherein said composite material further comprises a blended polypropylene film having inorganic talc blended therein further superposed on said first polypropylene film which is formed directly on one side of said biaxially stretched film.

18. The retort container according to claim 17, wherein said composite material further comprises a second polypropylene film having a thickness from about 50 to about 100 micrometers provided between said first polypropylene film and said blended polypropylene film.

19. The retort container according to claim 15, wherein said top material further comprises a simultaneously biaxially stretched film of nylon 6 provided between said biaxially stretched film and said plastic film.

20. The retort container according to claim 19, wherein said simultaneously biaxially stretched film of nylon 6 has a thickness of from 10 to about 30 micrometers.

* * * * *